US012784138B2

(12) United States Patent
Gu et al.

(10) Patent No.: US 12,784,138 B2
(45) Date of Patent: Nov. 3, 2026

(54) VIDEO BANDWIDTH OPTIMIZATION

(71) Applicant: Zoom Communications, Inc., San Jose, CA (US)

(72) Inventors: Tianming Gu, Hangzhou (CN); Dewang Hou, Hangzhou (CN); Bo Ling, Saratoga, CA (US); Xiran Wang, San Jose, CA (US); Huixi Zhao, San Jose, CA (US)

(73) Assignee: Zoom Communications, Inc., San Jose, CA (US)

( * ) Notice: Subject to any disclaimer, the term of this patent is extended or adjusted under 35 U.S.C. 154(b) by 329 days.

(21) Appl. No.: 18/436,755

(22) Filed: Feb. 8, 2024

(65) Prior Publication Data

US 2024/0185384 A1 Jun. 6, 2024

Related U.S. Application Data

(63) Continuation of application No. 17/877,893, filed on Jul. 30, 2022, now Pat. No. 11,948,275.

(30) Foreign Application Priority Data

Jul. 13, 2022 (CN) ......................... 202221803033.6

(51) Int. Cl.

| | |
|---|---|
| ***G06T 3/4053*** | (2024.01) |
| ***G06T 3/4046*** | (2024.01) |
| ***G06V 10/77*** | (2022.01) |

(52) U.S. Cl.

CPC .......... *G06T 3/4053* (2013.01); *G06T 3/4046* (2013.01); *G06V 10/7715* (2022.01); *G06T 2207/10016* (2013.01); *G06T 2207/20016* (2013.01); *G06T 2207/20081* (2013.01)

(58) Field of Classification Search

None

See application file for complete search history.

(56) References Cited

U.S. PATENT DOCUMENTS

| | | | | |
|---|---|---|---|---|
| 9,854,020 | B1 * | 12/2017 | Kum ..................... | H04L 65/752 |
| 10,999,344 | B1 | 5/2021 | Babkin et al. | |
| 2012/0011194 | A1 * | 1/2012 | Tahan ................... | G06F 3/0481 709/203 |

(Continued)

FOREIGN PATENT DOCUMENTS

| | | | | | |
|---|---|---|---|---|---|
| WO | WO-2020256704 | A1 * | 12/2020 | ............. | G06N 5/046 |
| WO | 2022081175 | A1 | 4/2022 | | |

OTHER PUBLICATIONS

Yi, Juheon & Kim, Seongwon & Kim, Joongheon & Choi, Sunghyun. (2020). Supremo: cloud-Assisted Low-Latency Super-Resolution in Mobile Devices. IEEE Transactions on Mobile Computing. pp. 1-1. 10.1109/TMC.2020.3025300.

(Continued)

*Primary Examiner* — Jiangeng Sun

(57) ABSTRACT

Video bandwidth optimization may be implemented using video resolution downscaling and upscaling in a video communications platform. Video bandwidth optimization may include receiving a first video stream comprising first multiple image frames at a first resolution. A video stream may be generated at a second resolution higher than the first resolution using a trained machine learning network. A user interface may display the video stream.

20 Claims, 9 Drawing Sheets

(56) References Cited

U.S. PATENT DOCUMENTS

| | | | | |
|---|---|---|---|---|
| 2012/0011568 | A1* | 1/2012 | Tahan | G06F 3/0481 345/634 |
| 2016/0057087 | A1* | 2/2016 | Gomba | H04L 51/10 709/206 |
| 2018/0342045 | A1* | 11/2018 | Lutz | G06T 3/4046 |
| 2020/0349681 | A1* | 11/2020 | Andrei | G06N 3/088 |
| 2020/0402205 | A1 | 12/2020 | Su et al. | |
| 2021/0209733 | A1* | 7/2021 | Kolavennu | G06T 1/20 |
| 2021/0303243 | A1 | 9/2021 | Li et al. | |
| 2022/0198774 | A1 | 6/2022 | Wang et al. | |
| 2022/0374714 | A1* | 11/2022 | Nayak | G06T 3/4053 |
| 2023/0143389 | A1* | 5/2023 | Bampis | G06T 3/4046 375/240.26 |

OTHER PUBLICATIONS

Royson Lee, Stylianos I. Venieris, Nicholas D. Lane, “Neural Enhancement in Content Delivery Systems: The State-of-theArt and Future Directions”, arXiv:2010.05838v2 [cs.CV] Oct. 22, 2020.

* cited by examiner

VIDEO BANDWIDTH OPTIMIZATION

CROSS-REFERENCE TO RELATED APPLICATIONS

This application is a continuation of U.S. patent application Ser. No. 17/877,893, filed Jul. 30, 2022, which claims priority to Chinese Patent Application No. 202221803033.6, filed Jul. 13, 2022, the entire disclosures of which are hereby incorporated by reference.

FIELD

This application relates generally to video bandwidth optimization, and more particularly, to systems and methods for video resolution downscaling and upscaling within a video communications platform.

SUMMARY

The appended claims may serve as a summary of this application.

DETAILED DESCRIPTION OF THE DRAWINGS

Figure 1A:
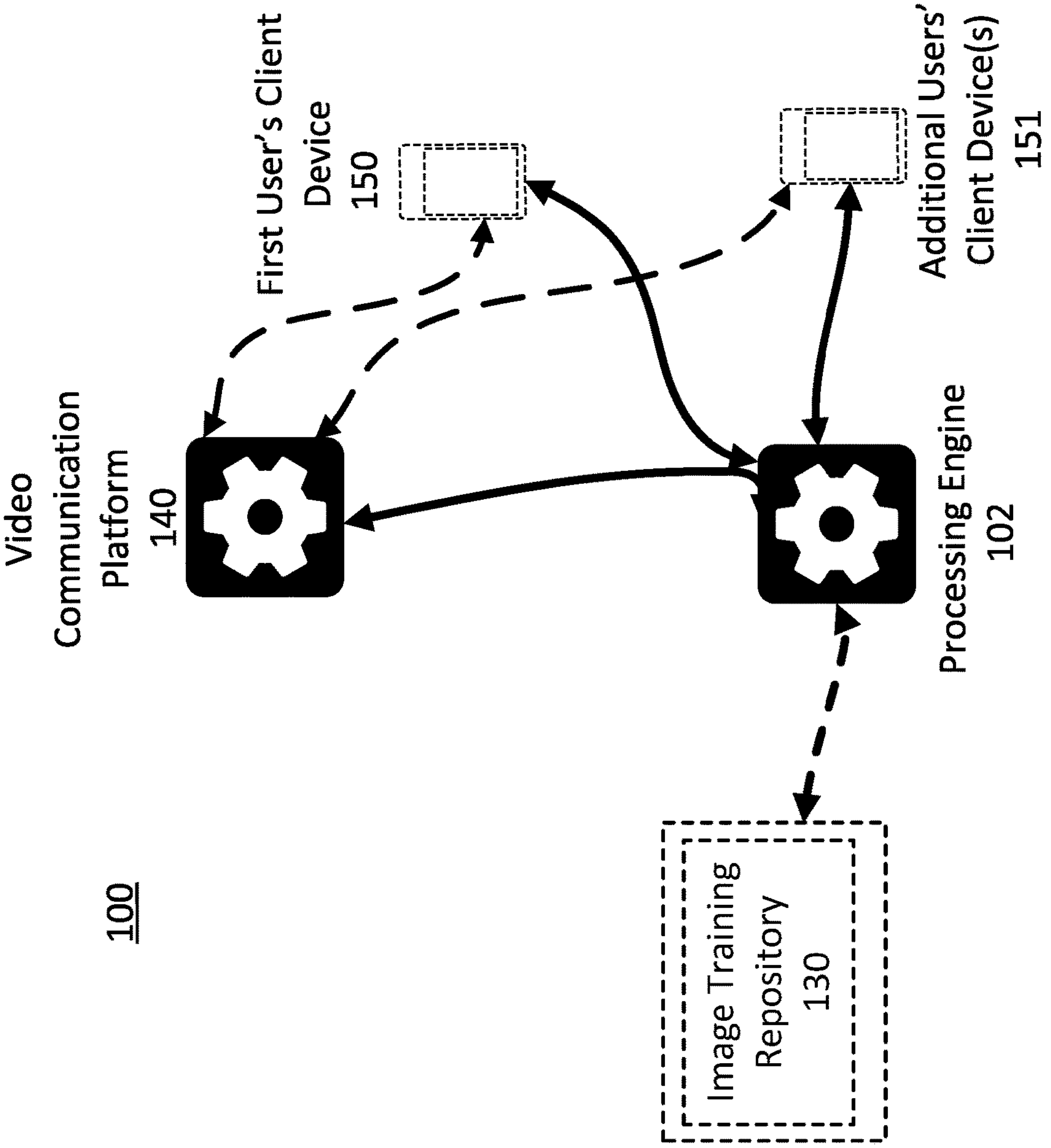
FIG. 1A is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

FIG. 1A is a diagram illustrating an exemplary environment in which some embodiments may operate. In the exemplary environment 100, a first user's client device 150 and one or more additional users' client device(s) 151 are connected to a processing engine 102 and, optionally, a video communication platform 140. The processing engine 102 is connected to the video communication platform 140, and optionally connected to one or more repositories (e.g., non-transitory data storage) and/or databases, including an image training repository 130 for training a machine learning network. One or more of the databases may be combined or split into multiple databases. The first user's client device 150 and additional users' client device(s) 151 in this environment may be computers, and the video communication platform server 140 and processing engine 102 may be applications or software hosted on a computer or multiple computers which are communicatively coupled via remote server or locally.

The exemplary environment 100 is illustrated with only one additional user's client device, one processing engine, and one video communication platform, though in practice there may be more or fewer additional users' client devices, processing engines, and/or video communication platforms. In some embodiments, one or more of the first user's client device, additional users' client devices, processing engine, and/or video communication platform may be part of the same computer or device.

In an embodiment, processing engine 102 may perform the methods 300, 400 or other methods herein and, as a result, provide for video downscaling and upscaling in a video communications platform. In some embodiments, this may be accomplished via communication with the first user's client device 150, additional users' client device(s) 151, processing engine 102, video communication platform 140, and/or other device(s) over a network between the device(s) and an application server or some other network server. In some embodiments, the processing engine 102 is an application, browser extension, or other piece of software hosted on a computer or similar device or is itself a computer or similar device configured to host an application, browser extension, or other piece of software to perform some of the methods and embodiments herein.

In some embodiments, the first user's client device 150 and additional users' client devices 151 may perform the methods 300, 400 or other methods herein and, as a result, provide for video stream downscaling and upscaling in a video communications platform. In some embodiments, this may be accomplished via communication with the first user's client device 150, additional users' client device(s) 151, processing engine 102, video communication platform 140, and/or other device(s) over a network between the device(s) and an application server or some other network server.

The first user's client device 150 and additional users' client device(s) 151 may be devices with a display configured to present information to a user of the device. In some embodiments, the first user's client device 150 and additional users' client device(s) 151 present information in the form of a user interface (UI) with UI elements or components. In some embodiments, the first user's client device 150 and additional users' client device(s) 151 send and receive signals and/or information to the processing engine 102 and/or video communication platform 140. The first user's client device 150 may be configured to perform functions related to presenting and playing back video, audio, documents, annotations, and other materials within a video presentation (e.g., a virtual class, lecture, video conference, webinar, or any other suitable video presentation) on a video communication platform. The additional users' client device(s) 151 may be configured to viewing the video presentation, and in some cases, presenting material and/or video as well. In some embodiments, first user's client device 150 and/or additional users' client device(s) 151 include an embedded or connected camera which is capable of generating and transmitting video content in real time or substantially real time. For example, one or more of the client devices may be smartphones with built-in cameras, and the smartphone operating software or applications may provide the ability to broadcast live streams based on the video generated by the built-in cameras. In some embodiments, the first user's client device 150 and additional users' client device(s) 151 are computing devices capable of hosting and executing one or more applications or other programs capable of sending and/or receiving information. In some embodiments, the first user's client device 150 and/or additional users' client device(s) 151 may be a computer desktop or laptop, mobile phone, video phone, conferencing system, or any other suitable computing device capable of sending and receiving information. In some embodiments, the processing engine 102 and/or video communication platform 140 may be hosted in whole or in part as an application or web service executed on the first user's client device 150 and/or additional users' client device(s) 151. In some embodiments, one or more of the video communication platform 140, processing engine 102, and first user's client device 150 or additional users' client devices 151 may be the same device. In some embodiments, the first user's client device 150 is associated with a first user account on the video communication platform, and the additional users' client device(s) 151 are associated with additional user account(s) on the video communication platform.

In some embodiments, optional repositories can include one or more of: an image training repository 130. The image training repository may include pairs of higher and lower resolution images used to train the machine learning network as described herein.

Video communication platform 140 comprises a platform configured to facilitate video presentations and/or communication between two or more parties, such as within a video conference or virtual classroom. In some embodiments, video communication platform 140 enables video conference sessions between one or more users.

Figure 1B:
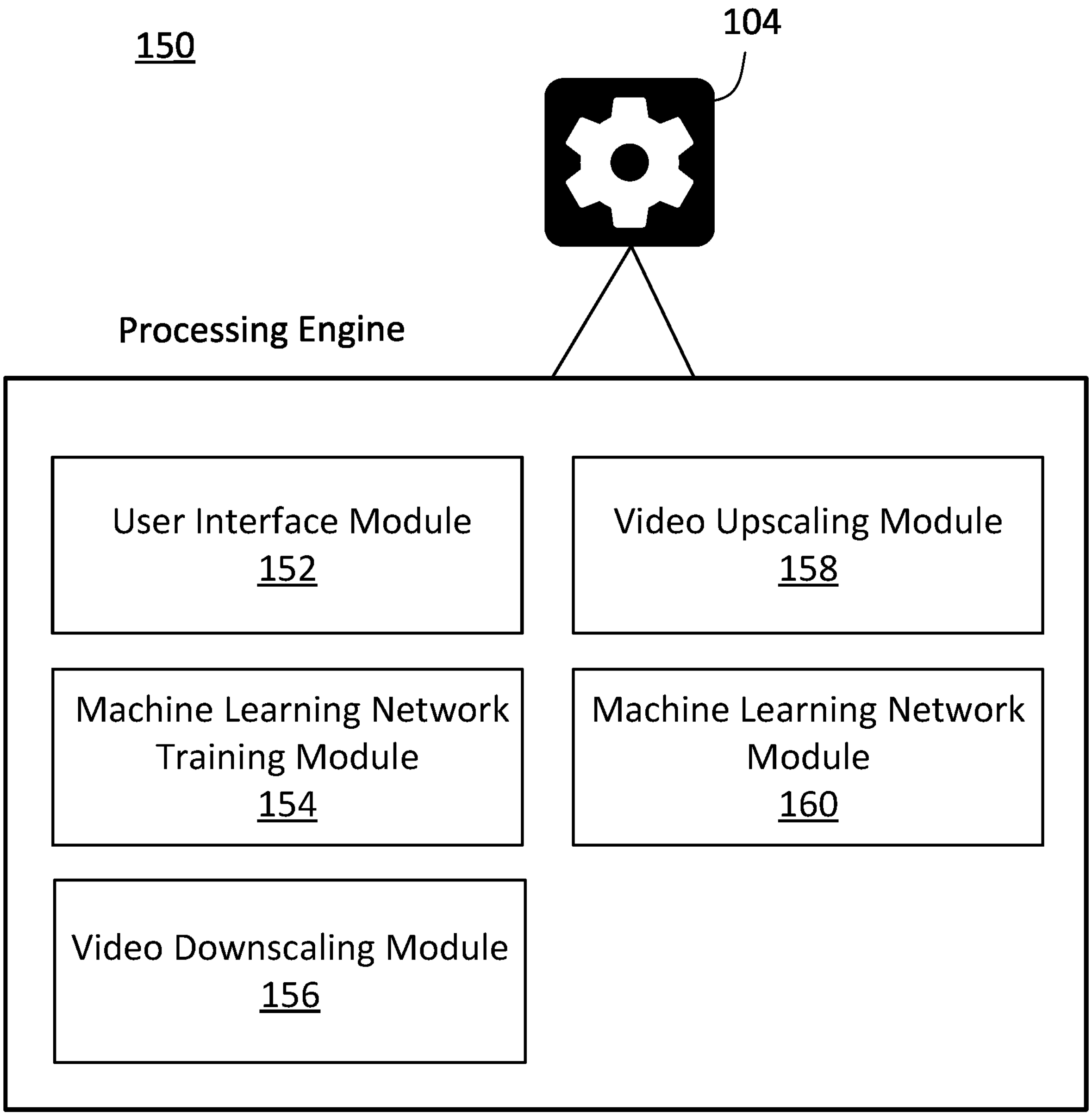
FIG. 1B is a diagram illustrating an exemplary computer system with software and/or hardware modules that may execute some of the functionality described herein.

FIG. 1B is a diagram illustrating an exemplary computer system 150 with software and/or hardware modules that may execute some of the functionality described herein. Computer system 150 may comprise, for example, a server or client device or a combination of server and client devices for video resolution downscaling and upscaling using a trained neural network for upscaling a video stream used within a video communications platform.

The User Interface Module 152 provides system functionality for presenting a user interface to one or more users of the video communication platform 140 and receiving and processing user input from the users. User inputs received by the user interface herein may include clicks, keyboard inputs, touch inputs, taps, swipes, gestures, voice commands, activation of interface controls, and other user inputs. In some embodiments, the User Interface Module 152 presents a visual user interface on a display screen. In some embodiments, the user interface may comprise audio user interfaces such as sound-based interfaces and voice commands.

The Machine Learning Network Training Module 154 provides system functionality for the training of a machine learning network based on image pairs depicting a same image but at different resolutions, such as an image in a lower resolution of 180p, 270p, 360p, 480p or 720p, and the higher resolution of 1080p.

The Video Downscaling Module 156 provides system functionality for the Downscaling of a video stream and/or images from a higher resolution, such as 1080p to a lower resolution of 180p, 270p, 360p, 480p or 720p. A client device may downscale video imagery received from a digital camera of a higher resolution to a lower resolution, and then transmit the lower resolution video imagery to another client device of the video communication platform. Downscaling an image reduces the resolution of the image from a first higher image to a second lower image. Reducing higher resolution video to lower resolution video decreases the amount of bandwidth used in the communication system. Various methods and processes may be used to downscale the video imagery, such as nearest-neighbor interpolation, bilinear and bicubic algorithms, Sinc and Lanczos resampling, Box sampling, Mipmap, Fourier-transform methods, Edge-directed interpolation, hqx, Vectorization. Other known methods and process may be suitable to downscale the video imagery.

In some embodiments, a client device may downscale the video imagery received from the digital camera to multiple different resolutions and transmit the different resolution images to different other client devices of the video communication platform. For example, the client device may receive a resolution parameter from the other client devices where the resolution parameter identifies or indicates a resolution of images to be sent to the other device. The client device may receive different resolution parameters from different other devices. For instance, one device may send a resolution parameter to receive images at a particular resolution, such as 360p, while another device may send a resolution parameter to receive images at another resolution, such as 720p. Based on the respective resolution parameters, the client device may then downscale the video imagery received from the digital camera to the respective image resolutions to send to the other devices. For example, the Video Downscaling Module 156 may generate, from reference images, corresponding images both at a resolution of 360p and at a resolution of 720p. The client device may transmit the generated images to the respective other devices at their desired or preferred resolution. The respective other devices receiving the images would then upscale their received images to a higher resolution and then display the upscaled images via a display device.

The Video Upscaling Module 158 provides system functionality for the upscaling of a video stream and/or images from a lower resolution, such as 180p, 270p, 360p, 480p or 720p to a higher resolution, such as 1080p. A client device may upscale video imagery received from another client device of the video communication platform. The receiving client device may use a trained machine learning network, such as the machine learning network described herein, to process received video imagery of a lower resolution and upscale the video imagery to a higher resolution.

The Machine Learning Network Module 160 provides system functionality for using a trained machine learning network to receive video imagery and upscale the video imagery input to the machine learning network at first resolution and outputting form the machine learning network modified video imagery at a second resolution, where the second resolution is at a higher resolution than the first resolution.

In some embodiments, one or machine learning models or networks may be trained to upscale images and the models or networks may be stored locally on a client device. Where the machine learning models or networks are stored on a local client device, the local client device may select among different stored machine learning models or networks to upscale received images. The machine learning models or networks may have different levels of processing complexity with varying degrees of image quality and/or image resolution output.

In some embodiments, one or more machine models or networks may be trained to upscale images and the models or networks may be stored on one or more intermediary servers. Where the machine learning models or networks are stored on an intermediary server, the intermediary server may receive downscaled images from one or more transmitting client devices at a first lower resolution (such as 180p, 270p, 360p, 480p or 720p). The intermediary server may upscale received images, via the trained machine learning model or network, to a higher resolution (such as 1080p). The output images at the higher resolution may then be transmitted from the intermediary server to one or more other client devices where the higher resolution images, without the need for further upscaling, may be displayed on a display device of the respective receiving client devices. The intermediary server may upscale the images in a real-time manner to display the upscaled images to various participants of a video conference. In some embodiments, the intermediary server may receive a resolution parameter as to the resolution that a client device prefers or requires to receive images. The intermediary server may then generate corresponding images at different resolutions and concurrently transmit the images to the client devices at their preferred or required resolution based on their resolution parameter. The intermediary server may facilitate real-time video conferencing among video participants while managing video stream upscaling and transmission to reduce overall network bandwidth.

Figure 2:
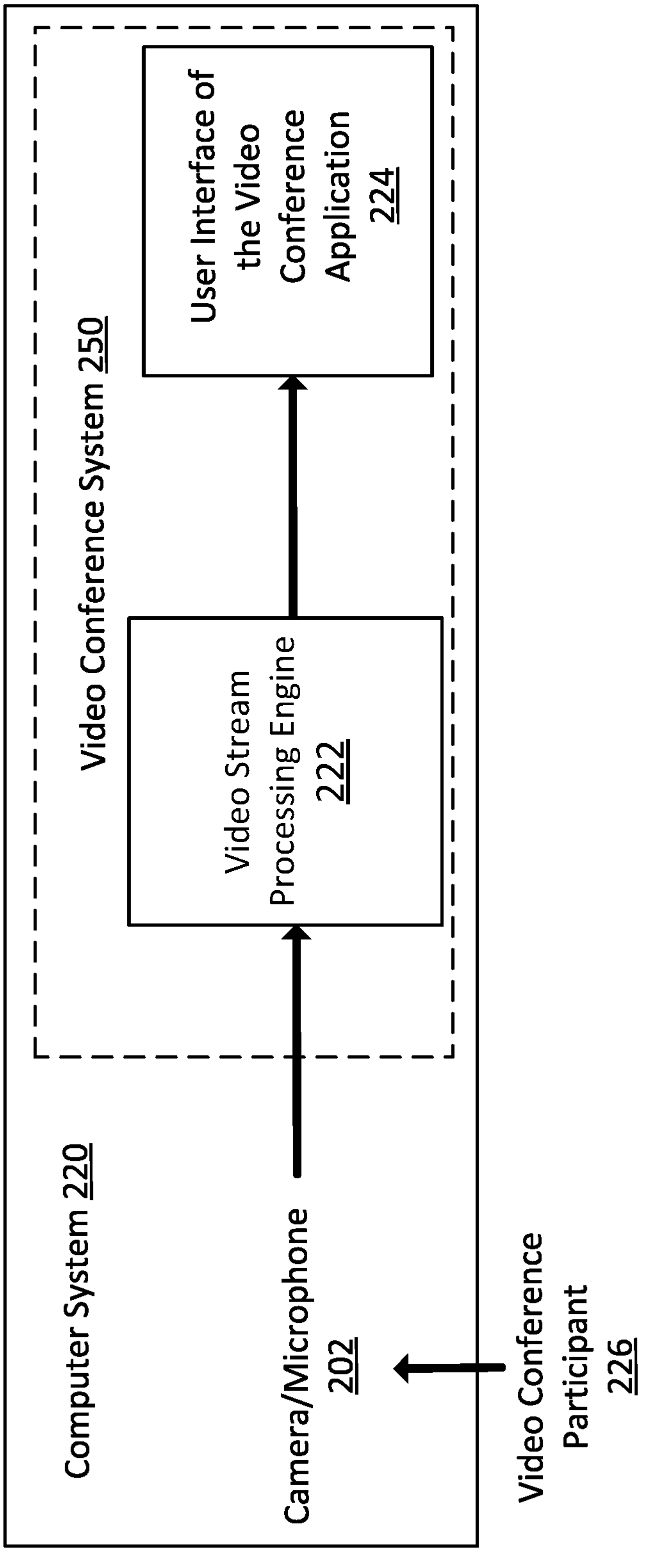
FIG. 2 is a diagram illustrating an exemplary environment in which some embodiments may operate.

FIG. 2 illustrates one or more client devices that may be used to participate in a video conference. In one embodiment, during a video conference, a computer system 220 (such as a desktop computer or a mobile phone) is used by a Video Conference Participant 226 (e.g., a user) to communicate with other video conference participants. A camera and microphone 202 of the computer system 202 captures video and audio of the video conference participant 226. The Video Conference System 250 receives a video stream of the captured video and audio and is processed by the Video Conference System 250. The Video Stream Processing Engine 222 may downscale the received video stream from a higher resolution (such as 1080p) to a lower resolution (such as 180p, 270p, 360p, 480p or 720p). This modified video stream of a lower resolution is then transmitted to other video conference participants. The Video Stream Processing Engine 222 may include the Video Downscaling Module 156, the Video Upscaling Module 158 and/or the Machine Learning Network Module 160.

In some embodiment, the Video Stream Processing Engine 222 may receive video streams of other video conference participants. The Video Stream Processing Engine 222 may the upscale these received video streams from a lower resolution (such as 180p, 270p, 360p, 480p or 720p) to a higher resolution (such as 1080p). The modified video steam of the higher resolution may be provided for display via the User Interface of the Video Conference Application 224.

In some embodiments, a receiving client device 220, may receive images from a first client device. For example, the received images may be at a first resolution (such as 180p, 270p, 360, 480p or 720p). The Video Conference System 250 may determine whether to upscale the received one or more images using an upscaling image process either using a trained machine learning model or using an upscaling image process using a non-machine learning model based process.

In some embodiments, the Video Conference System 250 may select the upscaling image process using a trained machine learning model and generate a first set of upscaled images by: inputting the received one or more images into the trained machine learning model, upscaling the received one or more images by the trained machine learning model, and then outputting by the trained machine learning model, one or more images at a second resolution that is at a resolution higher than the first resolution. The Video Conference System 250 may provide for display, via a user interface 224 of the receiving client device 220, the generated first set of upscaled images.

Moreover, the receiving client device may receive additional images from a second client device. These received additional images may be at the same resolution as the first resolution of the image received from the first client device or they could be at a different resolution than the first resolution. The Video Conference System 250 may generate a second set of upscaled images by: inputting the additional received one or more images into the trained machine learning model, upscaling the additional received one or more image frames by the trained machine learning model, and outputting by the trained machine learning model, additional one or more images at the second resolution. The Video Conference System 250 may provide for display, via the user interface 224 of the receiving client device 220, the generated second set of upscaled images.

In some embodiments, determining whether to upscale the received one or more images using an upscaling image process either using a trained machine learning model or using an upscaling image process using a non-machine learning model based process, may be based on evaluating processing criteria of the receiving device 220. For example, the Video Conference System 250 may determine the GPU and/or CPU processing capability. Depending on the processing capability, the trained machine learning mode process may be selected to upscale images. If, for example, the receiving device 220 has limited processing capability, the Video Conference System may choose to use a non-machine learning model process to upscale the images. Some non-machine learning model process may include traditional image upscaling methods such as: nearest-neighbor interpolation, bilinear and bicubic algorithms, Sinc and Lanczos resampling, Box sampling, Mipmap, Fourier-transform methods, Edge-directed interpolation, hqx, Vectorization. Other known methods and process may be suitable to upscale the images.

In some embodiments, other factors may be considered by the Video Conference System 250 to determine whether or not to use the trained machine learning model, such evaluating the remaining power capacity of a battery, whether the computer system is overheating, available network bandwidth, etc. Generally, a trained machine learning model will yield better upscaling image results than traditional image upscaling methods, but the trained machine learning model may use more computational CPU and/or GPU resources. As such, in certain situations, the Video Conference System 250 may need to forgo using the trained machine learning model when the use of the model is computationally heavy and the computer system 220 can not adequately use the trained model for upscaling images.

In some embodiments, the Video Conference System 250 may use multiple trained machine learning models that produce different levels of image quality and/or sharpness. For example, a higher image quality output at a particular resolution of one machine learning model may require more processing CPU and/or GPU resources than a machine learning model that produces or lesser quality image output. The Video Conference System 250 may select a first machine learning model and upscale images with the selected first machine learning model. The Video Conference System 250 may then switch to an alternate second machine learning model and upscale images with the second machine learning model. The Video Conference System 250 may also switch to upscaling images using traditional upscaling methods (such as those described herein). As previously discussed, Video Conference System 250 determine a machine learning model or a traditional upscaling method to use based on processing CPU and/or GPU, temperature values of the CPU and/or GPU, and other factors.

Figure 3:
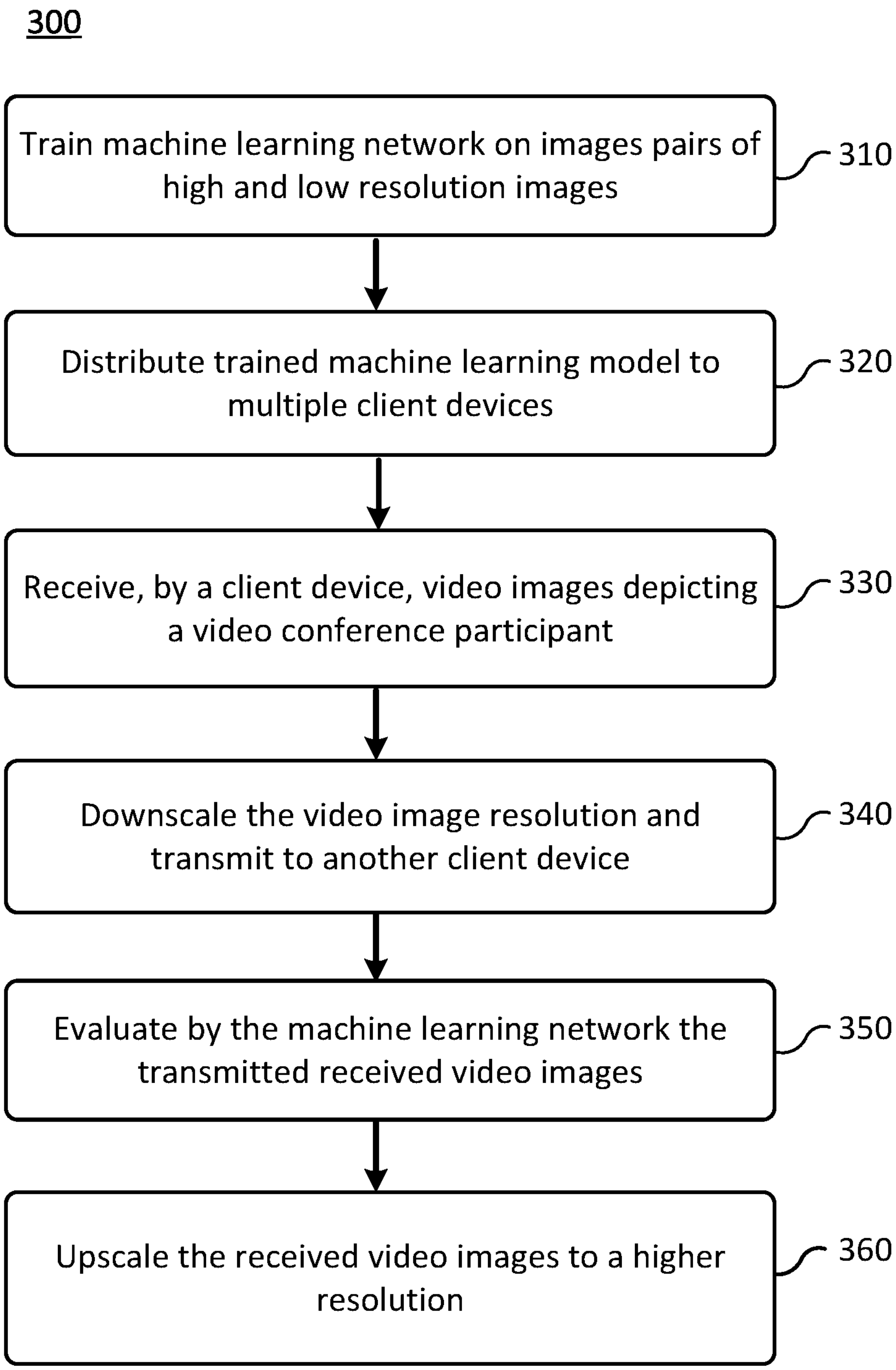
FIG. 3 is a flow chart illustrating an exemplary method that may be performed in some embodiments.

FIG. 3 is a flow chart illustrating an exemplary method 300 that may be performed in some embodiments. A machine learning network may be trained to evaluate video images and determine pose values of a person's head and/or upper body and determine facial expression parameter values of a person's face as depicted in an input image. In some embodiments, the system 100 may use machine learning techniques such as deep machine learning, learning-capable algorithms, artificial neural networks, hierarchical models and other artificial intelligence processes or algorithms that have been trained to perform image upscaling processing.

In step 310, a machine learning network may be trained on sets of image pairs. The training sets of images depict pairs of images with one image being at a first resolution and a second image depicting the same image but at a second (e.g., a higher resolution than the first image). In some embodiments, the machine learning network may also be trained to process images of a lower resolution and convert the images to a higher resolution.

In step 320, an electronic version or copy the trained machine learning network may be distributed to multiple client devices. For example, the trained machine learning network may be transmitted to and locally stored on client devices. The machine learning network may be updated and further trained from time to time and the machine learning network may be distributed to a client device 150, 151, and stored locally.

In step 330, a first client device receives video imagery depicting a video conference participant. For example, the video imagery is received at a resolution as generated by the camera of the client device (e.g., 1080p).

In step 340, the first client device downscales the video imagery to a lower resolution to generate a modified image stream. For example, imagery generated by the camera at 1080p may be downscaled to a resolution of 180p, 270p, 360p, 480p or 720p. The modified image stream is then transmitted by the first client device to one or more other client devices (such as a second client device, third client device, fourth client device, etc.). The downscaled images may be compressed before being transmitted.

At step 350, one of the client devices receiving the modified image stream then evaluates the video images transmitted from the first client device. Where there are more than one client device receiving the modified image stream, each of the client devices may evaluate the video images transmitted from the first client device. If the received images are compressed, they may be decompressed.

At step 360, the received modified video stream is then upscaled using a trained machine learning network (such as described herein). This generates an upscaled video stream at a higher resolution (such as 1080p) than the received modified video stream. The upscaled video stream is then presented via a user interface of client device that received the modified image stream from step 350. Where there are more than one client device receiving the modified image stream, each of the client devices may upscale the received modified video stream, and present the upscaled video stream via respective user interfaces of the one or more other client devices.

Figure 4:
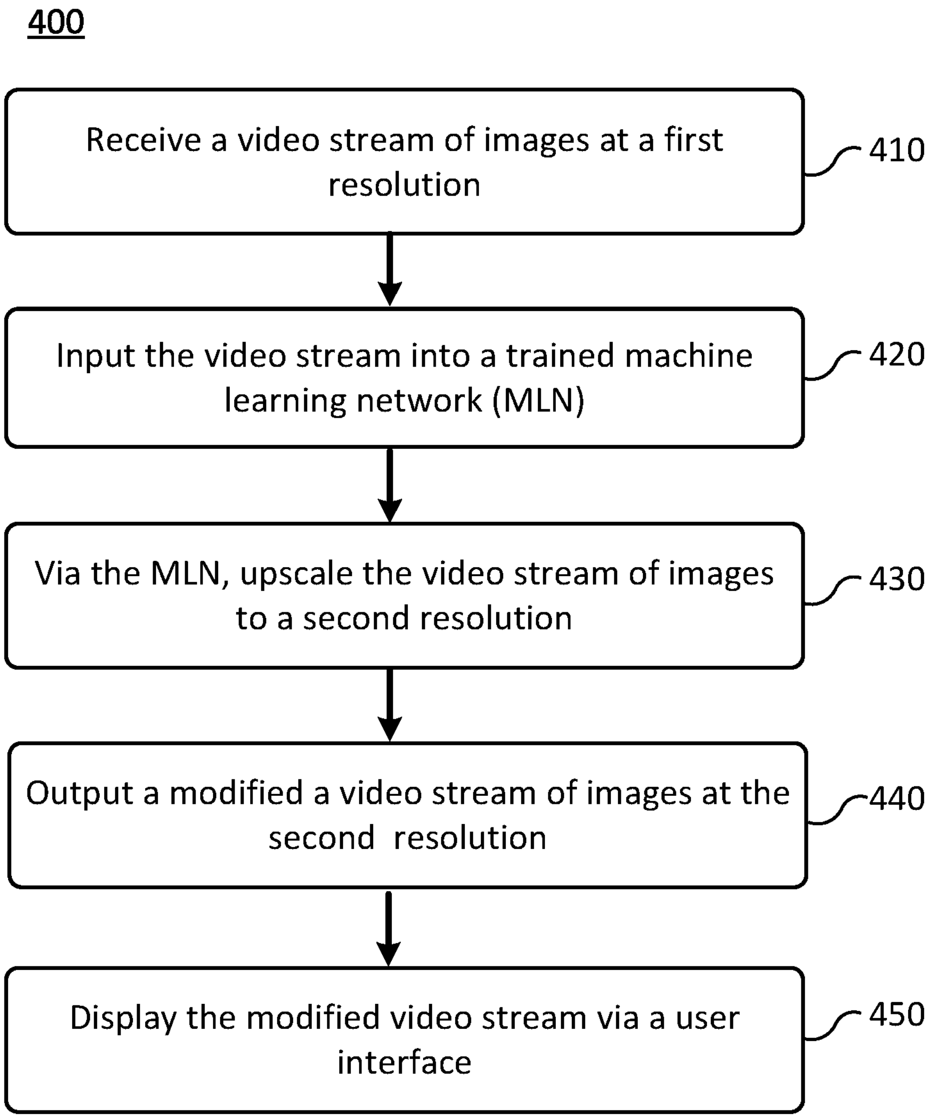
FIG. 4 is a flow chart illustrating an exemplary method that may be performed in some embodiments.

FIG. 4 is a flow chart illustrating an exemplary method 400 that may be performed in some embodiments. In some embodiments, the system 100 provides for processing and translating a received video stream of a low resolution (such as 180p, 270p, 360p, 480p or 720p) into a modified video stream of a higher resolution for display via a user interface.

At step 410, a receiving client device receives a video stream at a first resolution from another client device. For example, the client may receive one or more images from the first client device at a resolution of 180p, 270p, 360p, 480p or 720. Other resolutions may be used as the first resolution. The client device may receive multiple video streams at the first resolution from multiple other client devices.

In some embodiments, the receiving client device may optionally determine whether to upscale the received one or more images using an upscaling image process either using a trained machine learning model or using an upscaling image process using a non-machine learning model based process. For example, the receiving client device may select an upscaling image process using a trained machine learning (such as described herein).

At step 420, the first client device inputs the received video stream(s) (e.g., the received one or more images) into a trained machine learning network (MLN). For example, the machine learning network (such as a convolutional neural network, recurrent neural network, or other type of machine learning networks) may be trained on image pairs such that the trained MLN may receive an input an image at a first resolution and output an image at a higher resolution than the first resolution. An example MLN is described herein with regard to FIG. 5.

At step 430, the MLN upscales the video stream of images to a second resolution. The MLN may receive input images at a first resolution and then process the image to upscale the images to a second resolution that is a resolution higher than the first resolution.

In some embodiments, the receiving client device may perform a decompression process on the received images. Moreover, a receiving client device may use the information from the decompression process to identify those pixels that have changing areas. The receiving client device may use information from the codec process to determine which portions of the image frames are static or not. Those image portions determined to be changing then may be input into the machine learning model, while the non-changing portions of the image would not be input into the machine learning model. Inputting only the changing image sections improves processing efficiency so that the MLN only needs to upscale those portions of the images that are changing. A previous image already having been upscaled may be combined with the particular upscaled image portions to produce a composite upscaled images. The composite upscaled image may then be displayed via a user interface.

At step 440, the MLN outputs images at a second resolution where the second resolution is a higher resolution than the first resolution. For example, the MLN may receive an image at a resolution of 360p and output an image corresponding to the received image at a resolution of 1080p.

At step 450, the upscaled output images are displayed vide a user interface of the first client device.

Figure 5:
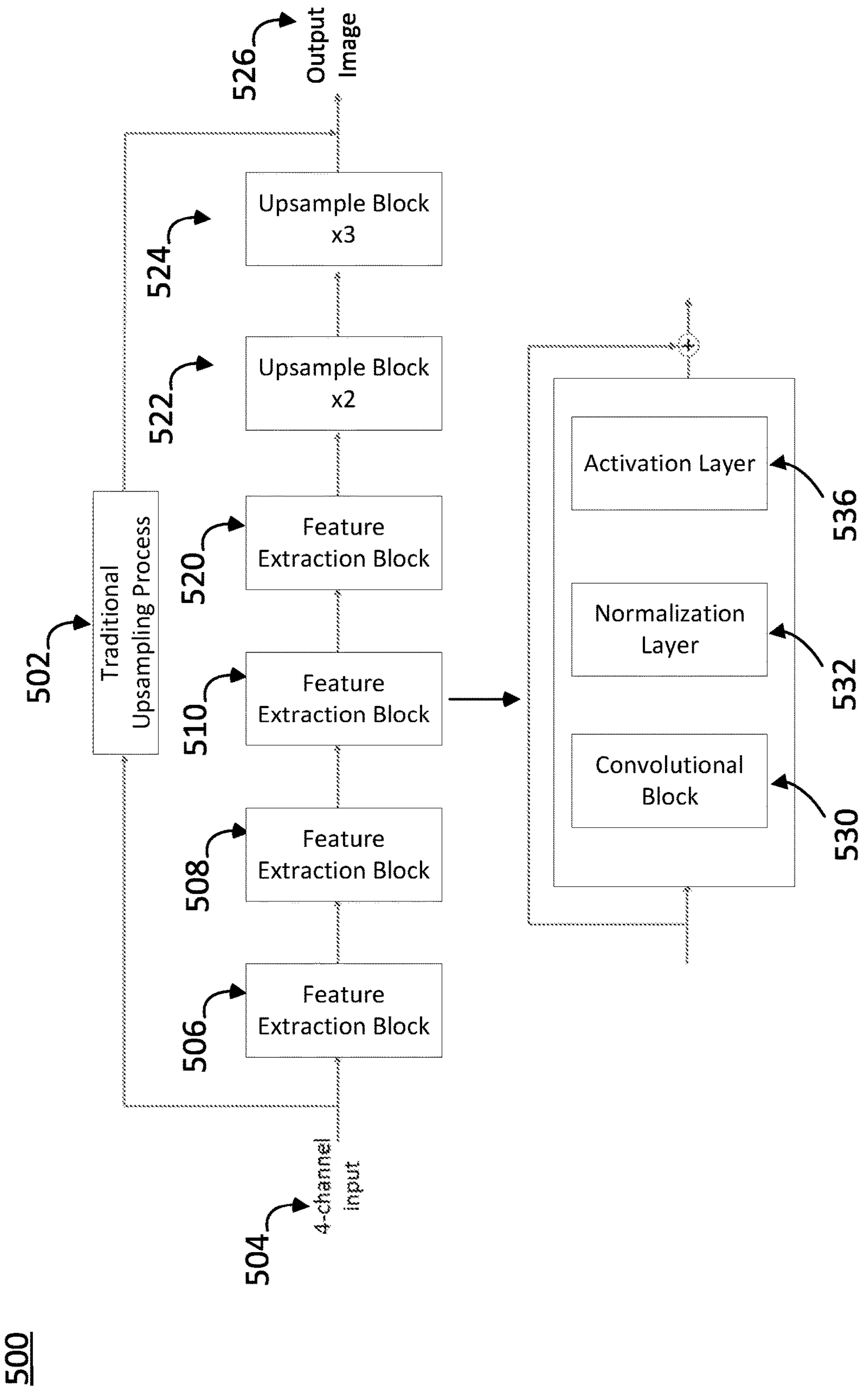
FIG. 5 is a diagram illustrating an exemplary neural network that may be used in some embodiments.

FIG. 5 is a diagram illustrating an exemplary machine learning network 500 that may be used in some embodiments. The machine learning network 500 may be trained to input a low resolution image and output a higher resolution image. For example, the machine learning network may receive a video stream of low resolution images and out a video stream of higher resolution images. The machine learning network may be trained using image pairs of a first resolution (e.g., 360p) and a second resolution (e.g., 1080p).

The trained machine learning network 500 may be distributed to client devices where the client device may use the machine learning network to upscale to a higher resolution images received at lower resolution. For example, the trained machine learning network may receive input images at a first resolution (e.g., from a video stream of image frames), and then output images at a second resolution where the second resolution is higher than the first resolution. The output images may then be displayed via a user interface of the client device. Further, the machine learning network may be trained on image pairs of a third resolution and the first resolution (e.g., data sets of image pairs of 480p and 1080p). The table below illustrates different image pair resolution combinations that may be used to train the machine learning network 500.

In some embodiments, image pair training datasets may include any one or a combination of the following image pairs: 240p (i.e., 352×240) and 720p (i.e., 1280×720 pixels); 360p (i.e., 480×360) and 720p; 360p and 1080p (i.e., 1920×1080 pixels); 480p and 1080p, 720p and 1080p; 360p and 2K (i.e., 2048×1080 pixels); 480p and 2K, 720p and 2K; 1080p and 2k; 360p and 1440p (i.e., 2560×1440 pixels); 480p and 1440p, 720p and 1440p; 1080p and 1440p; 360p and 4K (i.e., 3840×2160); 480p and 4K, 720p and 4K; 1080p and 4K; 1440p and 4K; 360p and 8K (i.e., 7680×4320); 480p and 8K, 720p and 8K; 1080p and 8K; 1440p and 8K; 4K and 8K; 360p and 1080p; 180p→540p; 270p→810p. The foregoing is meant for illustration, and machine learning network 500 may be trained to upscale images at resolutions not identified.

In some embodiments, a machine learning model may be trained to image upscale only from one predetermined lower resolution to one predetermined higher resolution. In some embodiments, a machine learning model may be trained to image upscale from multiple different lower resolutions to one predetermined higher resolution. In some embodiment, the machine learning model may be trained to image upscale from multiple different lower resolutions to multiple higher resolutions.

In some embodiments, datasets of image pairs may be created by downscaling an image from the higher resolution to the lower resolution. For example, 10,000 images at a resolution of 1080p may be processed to downscale to create corresponding images at a resolution of 360p. This would create 10,000 images at a resolution of 360p. The image pairs of 1080p and 360p would then be used to train the machine learning network 500. Various methods and processes may be used to downscale the higher resolution images, such as nearest-neighbor interpolation, bilinear and bicubic algorithms, Sinc and Lanczos resampling, Box sampling, Mipmap, Fourier-transform methods, Edge-directed interpolation, hqx, Vectorization. Other known methods and process may be suitable to downscale the video imagery.

In some embodiments, the machine learning network may also be trained to provide image sharpening, image contrast enhancement, image denoising and/or image artifacts removal/correction and/or other image enhancements.

In some embodiments, after being trained, the machine learning network 500 may receive an input image at a particular resolution, the output resolution size may be a set resolution that is always used such as always upscaling a received image of 240p, 360p, 720p to the set resolution of 1080p. In other embodiments, the machine learning network 500 may upscale the image to the highest resolution available on a display of a client device. For example, a first client device may have a display capable of displaying at a resolution of 1080p, while a second client device may have a display capable of displaying at a resolution of 2K. During a communication session between video participants using the first and second client device, the first client device would upscale received video images, via the trained machine learning network 500, to a resolution of 1080p. The second client device would upscale the received video images, via the trained machine learning network 500, to a resolution of 2K.

In some embodiments, the machine learning network 500 may have a multiple channel input, such as a 4-channel input. A 4-channel input provides for a reduction in the complexity of the model as compared to a larger channel input. In other embodiments, the machine learning network 500 may include n-channel inputs, where n is a positive integer number divisible by 2. The machine learning network 500 includes multiple feature extraction blocks 506, 508, 510 and 520 which feeds into 2 upsample blocks 522, 524. A client device may preprocess input images to divide the image into four parts (e.g., four sub-images), for example through uniform sampling. The resulting four sub-images are stacked together as a 4-channel input into the machine learning network 500. In some embodiments, the machine learning network 500 may include a 16-channel output which would provide a ×2 upsampled image after pixel shuffling. In some embodiments, the machine learning network 500 may include a higher number of channel outputs depending on the number of times an image is upsampled after pixel shuffling.

In some embodiments, the input sub-images to machine learning network may be grayscale image information using the Y channel of the image in Yuv format. The Yuv color space separates the brightness information Y of the image from the color information u and v. Applying only the Y channel of the sub-images via feature extraction blocks 506, 508, 510, 520 and the upsample blocks 522, 524, while upsampling u and v channels of the sub-images using a bilinear upsampling process 502 produces good results while reducing the number of calculation needed for model inference. In this embodiment, the Y channel of the upsampled image, via the machine learning network 500, and the u and v channels upsampled by the bilinear upsampling process are then combined to generate a composite upsampled image 526. A bilinear upsampling process may use nearby pixels to determine a pixel's value using linear interpolations.

In some embodiments, the machine learning network 500 may be trained to learn how to generate fine details for an output image given a low resolution input image. This may be achieved by introducing a skip connection which connects the input of the machine learning network 500 to the output directly instead of a skip connection between some inner layers. For example, through this skip connection, an upsampling algorithm, such as a bilinear upsampler 502 or a Catrom upsampler, may be applied on the low-resolution input. As a result, the neural network 500 is conditioned to learn the difference between the upsampled image and the ground truth of an image. Using the Catrom upsampler (also referred to as the Catmull-Rom filter), a peak signal-to-noise ratio (PSNR) of roughly 0.6 db higher has been achieved. Using the bilinear upsampler 502, a PSNR of roughly 0.5 db higher has been achieved.

In some embodiments, each of the feature extraction blocks 506, 508, 510, 520 may include a first convolution block 530, a first normalizer layer 532, and activation layer 536. The machine learning network 530 may use convolution blocks with m channels, where m may be a positive natural number divisible by 2, such as 32, 64 or 128.

In some embodiments, instead of using a single pixelshuffle for ×6 upscaling once, performing multiple pixelshuffles for upscaling may produce better results. To reduce the complexity of the model, ×2 upscaling may be performed first, via upsample block 522, so that the input to the final upsample block 524 has a lower input resolution, and then may provide ×3 upscaling.

In some embodiments, a final resolution of upscaled videos used within the communications platform will be higher than 720p and most likely be a resolution of 1080p at least. In some cases, a client device may apply a ×2 upscaling on a 360p input video, which generates a 720p upscaled video. The generated video may be upsampled again to some higher resolution such as 1080p. The upsampling resolution may be determined by the available output resolution of a display device of a client device or its operation system. The machine learning network may be modified to perform different upscaling based on the available output display resolution of the client device. For example, a ×2 upscaling, a ×3 upscaling or a ×6 upscaling may performed on the input image. More output layers of the machine learning network may be needed to provide for the flexibility of the multiple upscaling paths.

The machine learning network 500 is one example of a machine learning network that may be used to upsample a received image at a first lower resolution to a higher second resolution. This machine learning network 500 may be modified or adjusted to include or reduce the number of feature extraction blocks, the upsample blocks and the convolutional blocks.

Figure 6:
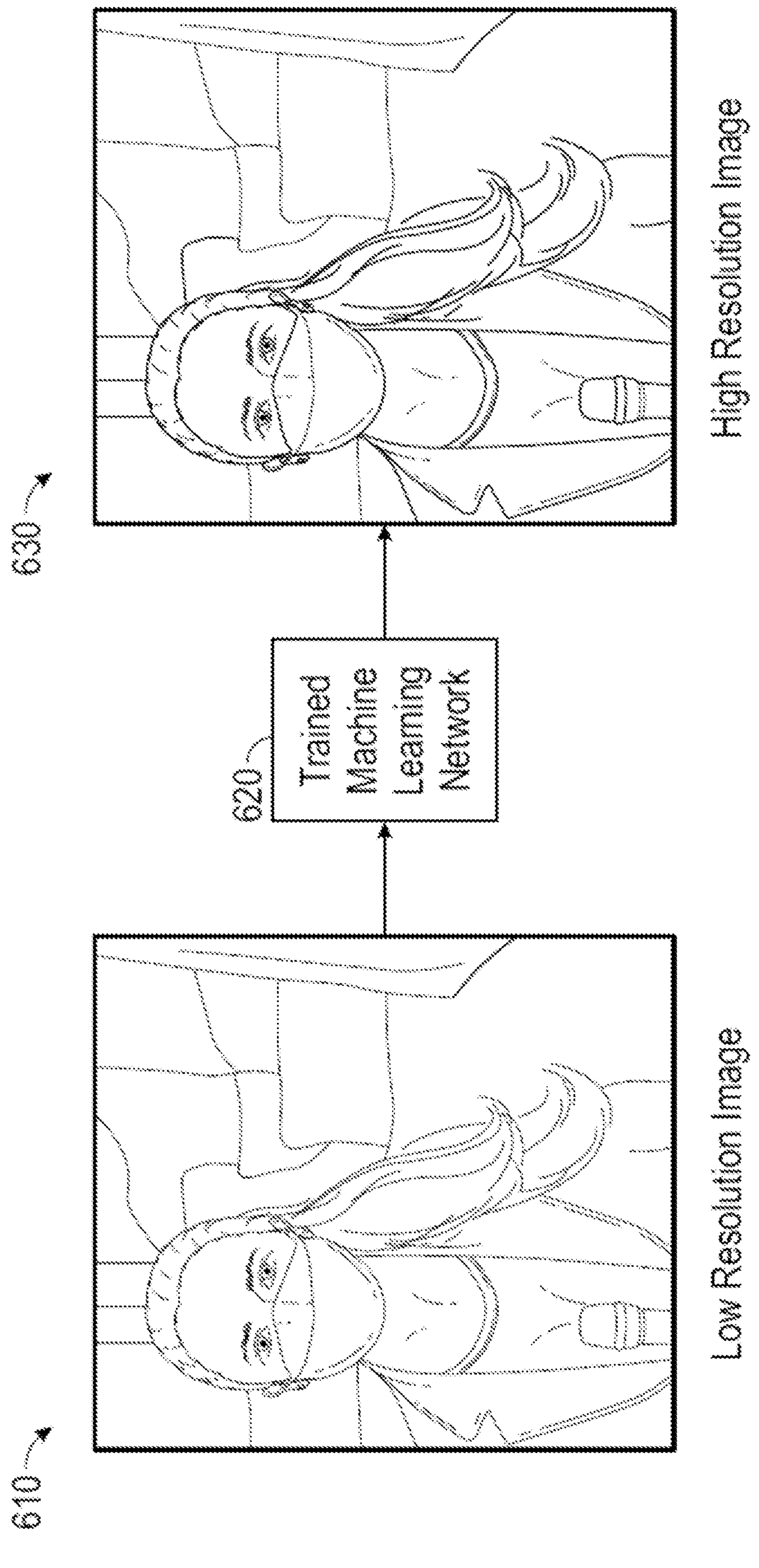
FIG. 6 is a diagram illustrating conversion of a low-resolution image being converted to a high-resolution image.

FIG. 6 is a diagram illustrating conversion of a low-resolution image being converted by a client device to a high-resolution image. In this example, a client device receives a video stream of low resolution video at 360p. Each of the video frames of the video stream are processed by a trained machine learning network 620 (as described herein). A low resolution image 610 at 360p is processed by the trained machine learning network 620 to output a high resolution image 630 at 1080p. The high resolution image 630 provides sharpness and clarity over the 360p image, especially when the high resolution image 630 is displayed on a larger monitor or screen.

In some embodiments, the downscaling of an image may introduce compression artifacts. For example, an originating client device decoding video bit streams to downscale the video frames may produce image that have compression artifacts. Also, downscaling of images from a higher resolution to a lower resolution may introduce artifacts. The trained machine learning network could enhance or resolve the compression and/or downscaling artifacts. Also, the receiving client device may perform an artifacts removal process on a received video frame to generate a modified image frame where the artifacts are suppressed. For example, an artifacts removal algorithm such as Dual-Domain Multi-Scale Convolutional Neural Network for compression artifacts removal may be used. The modified image frame may then be input into the trained machine learning network 620.

In some embodiments, a dering process may be applied to the received low resolution images. This may increase the sharpness of an output image of the trained machine learning network. The receiving client device may perform an edge detection on a received low resolution image. The detected edges objects in the image are enhanced to increase the lines of the detected edges. A modified image frame with the enhanced edges is then generated. The modified image frame is the input into the trained machine learning network 620.

Figure 7:
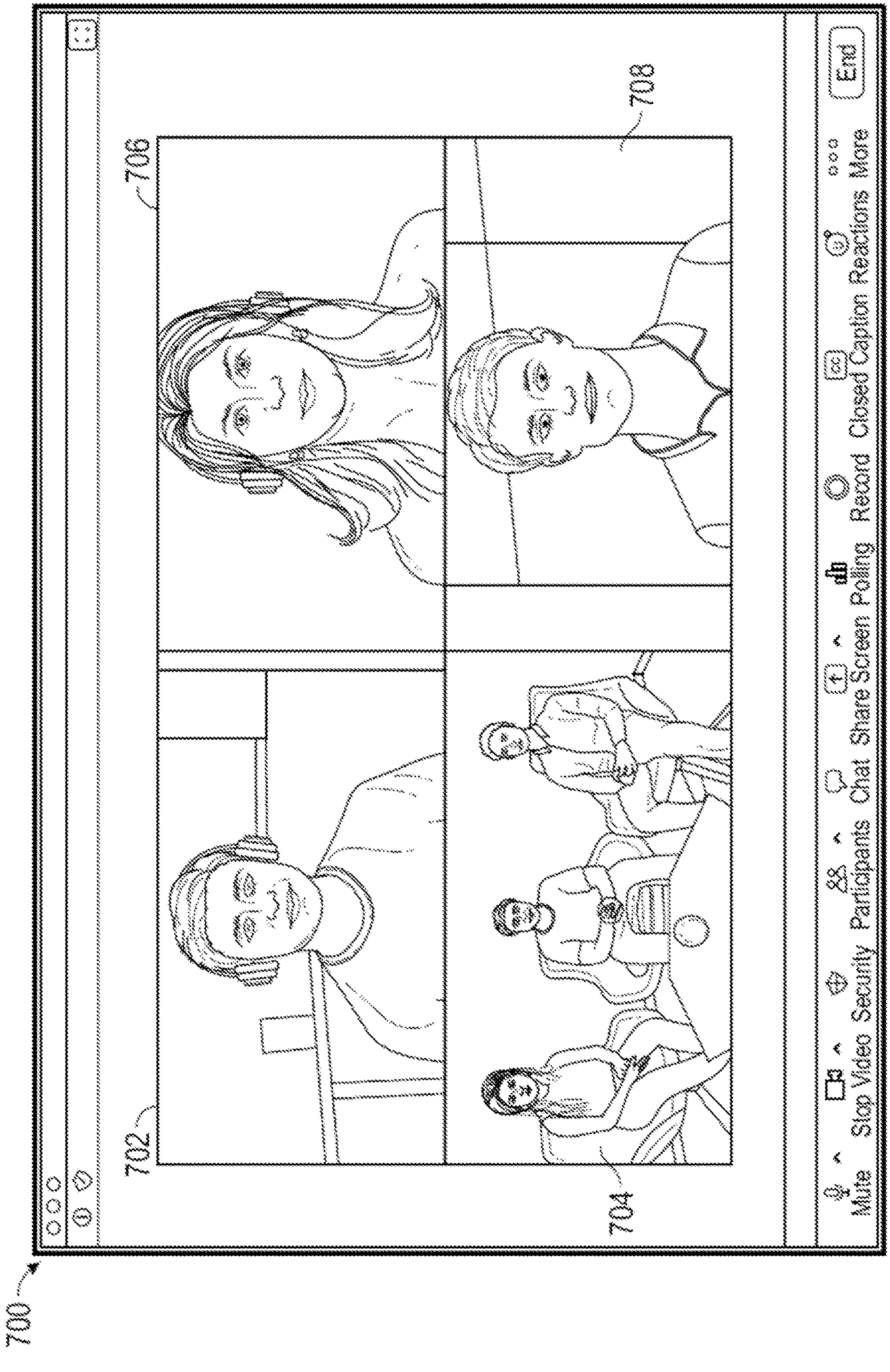
FIG. 7 is a diagram illustrating an exemplary user interface that may be used in some embodiments.

FIG. 7 is a diagram illustrating an exemplary user interface 700 that may be used in some embodiments. In this example, a client device receives a video stream from various video conference participants 702, 704, 706, 708 and the video streams are displayed via a user interface 700 of a client device. The client device may receive a low resolution video stream from one or more of the respective client devices of the video conference participants. The received low resolution video steams may be then upscaled to a higher resolution, and then displayed via the user interface 700.

In some embodiments, the client device may receive multiple low resolution video streams and process the low resolution video stream via a trained machine learning network (as described herein). The video displayed of video participants 702, 706 may be received by the client device as low resolution video which is processed by the trained machine learning network and then out via the user interface 700 at a resolution higher than the resolution of the respective received video streams. For example, the video displayed of video participant 702 may have been received at a resolution of 360p, processed by the trained machine learning network and output at 1080p. The video displayed of video participant 706 may have been received at 480p, processed by the trained machine learning network and output at 1080p.

Figure 8:
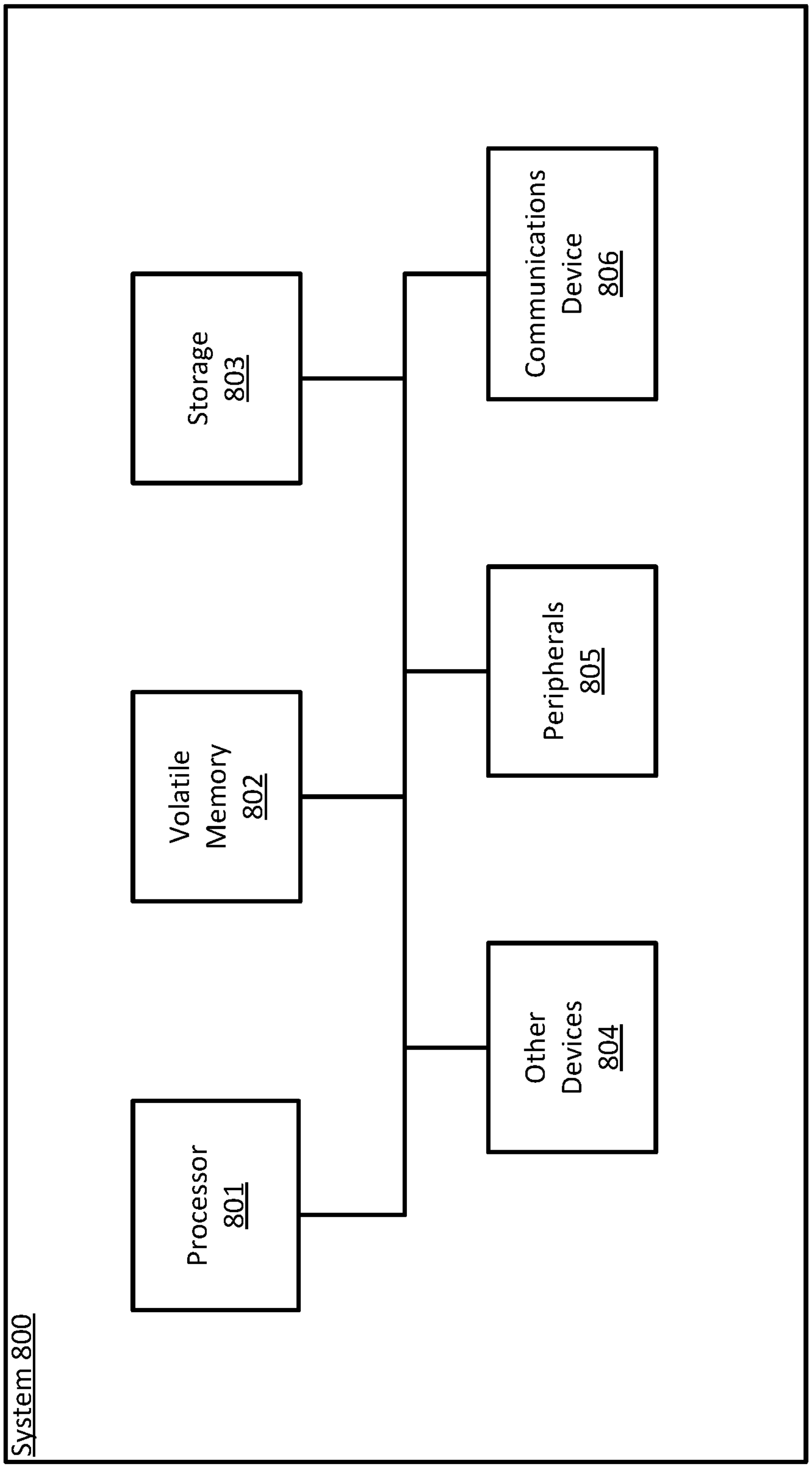
FIG. 8 is a diagram illustrating an exemplary computer that may perform processing in some embodiments.

FIG. 8 is a diagram illustrating an exemplary computer that may perform processing in some embodiments. Exemplary computer 800 may perform operations consistent with some embodiments. The architecture of computer 800 is exemplary. Computers can be implemented in a variety of other ways. A wide variety of computers can be used in accordance with the embodiments herein.

Processor 801 may perform computing functions such as running computer programs. The volatile memory 802 may provide temporary storage of data for the processor 801. RAM is one kind of volatile memory. Volatile memory typically requires power to maintain its stored information. Storage 803 provides computer storage for data, instructions, and/or arbitrary information. Non-volatile memory, which can preserve data even when not powered and including disks and flash memory, is an example of storage. Storage 803 may be organized as a file system, database, or in other ways. Data, instructions, and information may be loaded from storage 803 into volatile memory 802 for processing by the processor 801.

The computer 800 may include peripherals 805. Peripherals 805 may include input peripherals such as a keyboard, mouse, trackball, video camera, microphone, and other input devices. Peripherals 805 may also include output devices such as a display. Peripherals 805 may include removable media devices such as CD-R and DVD-R recorders/players. Communications device 806 may connect the computer 800 to an external medium. For example, communications device 806 may take the form of a network adapter that provides communications to a network. A computer 800 may also include a variety of other devices 804. The various components of the computer 800 may be connected by a connection medium such as a bus, crossbar, or network.

It will be appreciated that the present disclosure may include any one and up to all of the following examples.

Example 1: A computer-implemented method comprising: receiving, by a receiving client device, one or more images from a first client device, the one or more images being at a first resolution; determining whether to upscale the received one or more images using an upscaling image process either using a trained machine learning model or using an upscaling image process using a non-machine learning model based process; selecting the upscaling image process that uses a trained machine learning model and generating a first set of upscaled images by: inputting the received one or more images into the trained machine learning model; upscaling the received one or more images by the trained machine learning model; and outputting by the trained machine learning model, one or more images at a second resolution that is at a resolution higher than the first resolution; and providing for display, via a user interface of the receiving client device, the generated first set of upscaled images.

Example 2. The computer-implemented method of Example 1, wherein the first resolution is 180p, 270p, 360p, 480p or 720p, and the second resolution is 1080p.

Example 3. The computer-implemented method of any one of Examples 1-2, further comprising: receiving additional one or more images from a second client device, the additional one or more images being at the same resolution as the first resolution or a different resolution than the first resolution; generating a second set of upscaled images by: inputting the additional received one or more images into the trained machine learning model; and upscaling the additional received one or more image frames by the trained machine learning model; and outputting by the trained machine learning model, additional one or more images at the second resolution; and providing for display, via the user interface of the receiving client device, the second set of upscaled images frames.

Example 4. The computer-implemented method of any one of Examples 1-3, further comprising: receiving a client-based video stream from a camera operable with the first client device, the client-based video stream including multiple images at a resolution of 1080p or 720p; downscaling the multiple images of the client-based video stream from the resolution of 1080p or 720p to a lower resolution of 180p, 270p, 360p or 480p; and transmitting, from the first client device, the downscaled multiple images at the lower resolution to another client device.

Example 5. The computer-implemented method of any one of Examples 1-4, further comprising: training the machine learning model with multiple image pairs wherein the image pairs include an image at the first resolution and a corresponding image at the second resolution, wherein the machine learning model is trained to receive an input of an image at the first resolution and output an image at the second resolution, the second resolution being a higher resolution than the first resolution.

Example 6. The computer-implemented method of any one of Examples 1-5, wherein the machine learning model comprises a convolutional neural network (CNN) including: a multiple channel input to receive an input image into a series of feature extraction blocks; and multiple upsample blocks, wherein a final upsample block outputs an image of a resolution higher than the input image.

Example 7. The computer-implemented method of any one of Examples 1-6, wherein each of the feature extraction blocks include a first convolution block to increase a number of channels of the CNN and a second convolutional block to decrease the number of channels of the CNN.

Example 8. A non-transitory computer readable medium that stores executable program instructions that when executed by one or more computing devices configure the one or more computing devices to perform operations comprising: receiving, by a receiving client device, one or more images from a first client device, the one or more images being at a first resolution; determining whether to upscale the received one or more images using an upscaling image process either using a trained machine learning model or using an upscaling image process using a non-machine learning model based process; selecting the upscaling image process that uses a trained machine learning model and generating a first set of upscaled images by: inputting the received one or more images into the trained machine learning model; upscaling the received one or more images by the trained machine learning model; and outputting by the trained machine learning model, one or more images at a second resolution that is at a resolution higher than the first resolution; and providing for display, via a user interface of the receiving client device, the generated first set of upscaled images.

Example 9. The non-transitory computer readable medium of Example 8, wherein the first resolution is 180p, 270p, 360p, 480p or 720p, and the second resolution is 1080p.

Example 10. The non-transitory computer readable medium of any one of Examples 8-9, further comprising the operations of: receiving additional one or more images from a second client device, the additional one or more images being at the same resolution as the first resolution or a different resolution than the first resolution; generating a second set of upscaled images by: inputting the additional received one or more images into the trained machine learning model; and upscaling the additional received one or more image frames by the trained machine learning model; and outputting by the trained machine learning model, additional one or more images at the second resolution; and providing for display, via the user interface of the receiving client device, the second set of upscaled images frames.

Example 11. The non-transitory computer readable medium of any one of Examples 8-10, further comprising the operations of: receiving a client-based video stream from a camera operable with the first client device, the client-based video stream including multiple images at a resolution of 1080p or 720p; downscaling the multiple images of the client-based video stream from the resolution of 1080p or 720p to a lower resolution of 180p, 270p, 360p or 480p; and transmitting, from the first client device, the downscaled multiple images at the lower resolution to another client device.

Example 12. The non-transitory computer readable medium of any one of Examples 8-11, further comprising the operations of: training the machine learning model with multiple image pairs wherein the image pairs include an image at the first resolution and a corresponding image at the second resolution, wherein the machine learning model is trained to receive an input of an image at the first resolution and output an image at the second resolution, the second resolution being a higher resolution than the first resolution.

Example 13. The non-transitory computer readable medium of any one of Examples 8-12, wherein the machine learning model comprises a convolutional neural network (CNN) including: a multiple channel input to receive an input image into a series of feature extraction blocks; and multiple upsample blocks, wherein a final upsample block outputs an image of a resolution higher than the input image.

Example 14. The non-transitory computer readable medium of any one of Examples 8-13, wherein each of the feature extraction blocks include a first convolution block to increase a number of channels of the CNN and a second convolutional block to decrease the number of channels of the CNN.

Example 15. A system comprising one or more processors configured to perform the operations of: receiving, by a receiving client device, one or more images from a first client device, the one or more images being at a first resolution; determining whether to upscale the received one or more images using an upscaling image process either using a trained machine learning model or using an upscaling image process using a non-machine learning model based process; selecting the upscaling image process that uses a trained machine learning model and generating a first set of upscaled images by: inputting the received one or more images into the trained machine learning model; upscaling the received one or more images by the trained machine learning model; and outputting by the trained machine learning model, one or more images at a second resolution that is at a resolution higher than the first resolution; and providing for display, via a user interface of the receiving client device, the generated first set of upscaled images.

Example 16. The system of Example 15, wherein the first resolution is 180p, 270p, 360p, 480p or 720p, and the second resolution is 1080p.

Example 17. The system of any one of Examples 15-16, further comprising the operations of: receiving additional one or more images from a second client device, the additional one or more images being at the same resolution as the first resolution or a different resolution than the first resolution; generating a second set of upscaled images by: inputting the additional received one or more images into the trained machine learning model; and upscaling the additional received one or more image frames by the trained machine learning model; and outputting by the trained machine learning model, additional one or more images at the second resolution; and providing for display, via the user interface of the receiving client device, the second set of upscaled images frames.

Example 18. The system of any one of Examples 15-17, further comprising the operations of: receiving a client-based video stream from a camera operable with the first client device, the client-based video stream including multiple images at a resolution of 1080p or 720p; downscaling the multiple images of the client-based video stream from the resolution of 1080p or 720p to a lower resolution of 180p, 270p, 360p or 480p; and transmitting, from the first client device, the downscaled multiple images at the lower resolution to another client device.

Example 19. The system of any one of Examples 15-18, further comprising the operations of: training the machine learning model with multiple image pairs wherein the image pairs include an image at the first resolution and a corresponding image at the second resolution, wherein the machine learning model is trained to receive an input of an image at the first resolution and output an image at the second resolution, the second resolution being a higher resolution than the first resolution.

Example 20. The system of any one of Examples 15-16, wherein the machine learning model comprises a convolutional neural network (CNN) including: a multiple channel input to receive an input image into a series of feature extraction blocks; and multiple upsample blocks, wherein a final upsample block outputs an image of a resolution higher than the input image.

Example 21. The system of any one of Examples 15-20, wherein each of the feature extraction blocks include a first convolution block to increase a number of channels of the CNN and a second convolutional block to decrease the number of channels of the CNN.

An aspect may include a method that includes transmitting, by a first client device, a resolution parameter to a second client device. The resolution parameter may indicate a first resolution. The method may include receiving, by the first client device, one or more downscaled images at the first resolution from the second client device. The first client device may generate a first set of upscaled images. Generating the first set of upscaled images may include upscaling the received one or more downscaled images by a machine learning model. The upscaling may include generating a first sub-image of a respective input image. The upscaling may include generating a second sub-image of the respective input image. The method may include outputting, by the machine learning model, one or more images at a second resolution that is higher than the first resolution. The method may include displaying, via a user interface of the first client device, the generated first set of upscaled images.

An aspect may include a system that includes a first client device. The first client device may be configured to transmit a resolution parameter that indicates a first resolution to a second client device. The first client device may be configured to receive one or more downscaled images at the first resolution from the second client device. The first client device may be configured to generate a first set of upscaled images. The first client device may be configured to upscale the received one or more downscaled images by a machine learning model. The first client device may be configured to generate a first input sub-image of a respective input image. The first client device may be configured to generate a second input sub-image of the respective input image. The first client device may be configured to output, by the machine learning model, one or more images at a second resolution that is higher than the first resolution. The first client device may be configured to display, via a user interface of the first client device, the generated first set of upscaled images.

An aspect may include a non-transitory computer-readable medium comprising instructions that when executed by a processor, cause the processor to perform one or more operations. The one or more operations may include transmitting, from a first client device, a resolution parameter to a second client device. The resolution parameter may indicate a first resolution. The one or more operations may include receiving, by the first client device, one or more downscaled images at the first resolution from the second client device. The one or more operations may include generating a first set of upscaled images. The first set of upscaled images may be generated by upscaling the received one or more downscaled images by a machine learning model. The upscaling may include generating a first input sub-image of a respective input image. The upscaling may include generating a second input sub-image of a respective input image. The one or more operations may include outputting, by the machine learning model, one or more images at a second resolution that is higher than the first resolution. The one or more operations may include displaying, via a user interface of the first client device, the generated first set of upscaled images.

In one or more aspects, the first resolution may be any one of a resolution of 180p, 270p, 360p, 480p and 720p, and the second resolution is 1080p. In one or more aspects, additional one or more images may be received from the second client device. The additional one or more images may be at the first resolution or a different resolution. In one or more aspects, a second set of upscaled images may be generated. The second set of upscaled images may be generated by inputting the additional received one or more images into the machine learning model and upscaling the additional received one or more images by the machine learning model. In one or more aspects, the machine learning model may output the additional one or more images at the second resolution. In one or more aspects, the second set of upscaled images may be displayed via the user interface of the first client device. In one or more aspects, a video stream may be received from a camera operable with the first client device. The video stream may include multiple images at a resolution of 1080p or 720p. In one or more aspects, the multiple images may be downscaled from the resolution of 1080p or 720p to a lower resolution of 180p, 270p, 360p, or 480p. In one or more aspects, the downscaled multiple images at the lower resolution may be transmitted from the first client device to the second client device. In one or more aspects, the machine learning model may be trained with multiple image pairs. The multiple image pairs may each include an image at the first resolution and a corresponding image at the second resolution. In one or more aspects, the machine learning model may be trained to receive an input of an image at the first resolution and output an image at the second resolution. In one or more aspects, the machine learning model may include a CNN. In one or more aspects, the CNN may include a multiple channel input to receive an input image into a series of feature extraction blocks. In one or more aspects, the CNN may include multiple upsample blocks, wherein a final upsample block outputs an image of a resolution higher than the input image, wherein each of the feature extraction blocks include a first convolution block to increase a number of channels of the CNN and a second convolutional block to decrease the number of channels of the CNN. One or more aspects may include decompressing an image included in the received one or more downscaled images. One or more aspects may include identifying one or more pixel changing areas and one or more pixel non-changing areas in a decompressed version of the image. One or more aspects may include discarding each respective pixel non-changing area in the decompressed version of the image from a machine learning model input sourced from the image. One or more aspects may include selecting the one or more pixel changing areas as the machine learning model input sourced from the image. One or more aspects may include applying one or more feature extraction blocks and one or more upsample blocks to the first input sub-image. One or more aspects may include applying a bilinear upsampling process to the second input sub-image. One or more aspects may include generating a composite upsampled image based at least in part on the first and the second input sub-images. One or more aspects may include outputting the composite upsampled image.

Some portions of the preceding detailed descriptions have been presented in terms of algorithms, equations and/or symbolic representations of operations on data bits within a computer memory. These algorithmic and/or equation descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

Various general-purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method, comprising:

transmitting, by a first client device, a resolution parameter to a second client device, the resolution parameter indicating a first resolution;

receiving, by the first client device, one or more downscaled images at the first resolution from the second client device;

preprocessing each of the one or more downscaled images by dividing the downscaled image into a plurality of sub-images through uniform sampling to generate a first input sub-image and a second input sub-image of a respective input image;

inputting the first input sub-image and the second input sub-image as a multi-channel input into a machine learning model;

generating, by the first client device, a first set of upscaled images by upscaling each of the first input sub-image and the second input sub-image using the machine learning model;

outputting, by the first client device and using the machine learning model, one or more images at a second resolution that is higher than the first resolution; and displaying, via a user interface of the first client device, the first set of upscaled images.

2. The method of claim 1, wherein the first resolution is any one of a resolution of 180p, 270p, 360p, 480p and 720p, and the second resolution is 1080p.

3. The method of claim 1, further comprising:

receiving additional one or more images from the second client device, the additional one or more images being at the first resolution or a different resolution;

generating a second set of upscaled images by:

inputting the additional received one or more images into the machine learning model; and upscaling the additional received one or more images by the machine learning model; and outputting by the machine learning model, additional one or more images at the second resolution; and displaying, via the user interface of the first client device, the second set of upscaled images.

4. The method of claim 1, further comprising:

receiving a video stream from a camera operable with the first client device, the video stream including multiple images at a resolution of 1080p or 720p;

downscaling the multiple images from the resolution of 1080p or 720p to a lower resolution of 180p, 270p, 360p or 480p; and transmitting, from the first client device, the downscaled multiple images at the lower resolution to the second client device.

5. The method of claim 1, further comprising:

training the machine learning model with multiple image pairs, wherein the image pairs include an image at the first resolution and a corresponding image at the second resolution, and wherein the machine learning model is trained to receive an input of an image at the first resolution and output an image at the second resolution.

6. The method of claim 1, wherein the machine learning model comprises a convolutional neural network (CNN) including:

a multiple channel input to receive an input image into a series of feature extraction blocks; and multiple upsample blocks, wherein a final upsample block outputs an image of a resolution higher than the input image, wherein each of the feature extraction blocks include a first convolution block to increase a number of channels of the CNN and a second convolutional block to decrease the number of channels of the CNN.

7. The method of claim 1, further comprising:

decompressing an image included in the received one or more downscaled images;

identifying one or more pixel changing areas and one or more pixel non-changing areas in a decompressed version of the image; and discarding each respective pixel non-changing area in the decompressed version of the image from a machine learning model input sourced from the image; and selecting the one or more pixel changing areas as the machine learning model input sourced from the image.

8. The method of claim 1, wherein outputting by the machine learning model, one or more images at a second resolution comprises:

applying one or more feature extraction blocks and one or more upsample blocks to the first input sub-image;

applying a bilinear upsampling process to the second input sub-image;

generating a composite upsampled image based at least in part on the first and the second input sub-images; and outputting the composite upsampled image.

9. A system, comprising:
a first client device configured to:
transmit a resolution parameter that indicates a first resolution to a second client device;
receive one or more downscaled images at the first resolution from the second client device;
preprocess each of the one or more downscaled images by dividing the downscaled image into a plurality of sub-images through uniform sampling to generate a first input sub-image and a second input sub-image of a respective input image;
input the first input sub-image and the second input sub-image as a multi-channel input into a machine learning model;
upscale each of the first input sub-image and the second input sub-image by the machine learning model to generate a first set of upscaled images;
output, by the machine learning model, one or more images at a second resolution that is higher than the first resolution; and
display, via a user interface of the first client device, the first set of upscaled images.

10. The system of claim 9, wherein the first client device is further configured to:
receive additional one or more images from the second client device, the additional one or more images being at the first resolution or a different resolution than the first resolution;
generate a second set of upscaled images, the first client device further configured to:
input the additional received one or more images into the machine learning model;
upscale the additional received one or more images by the machine learning model;
output by the machine learning model, additional one or more images at the second resolution; and
display, via the user interface of the first client device, the second set of upscaled images.

11. The system of claim 9, wherein the first resolution is any one of a resolution of 180p, 270p, 360p, 480p and 720p, and the second resolution is 1080p, and the first device is further configured to:
receive a video stream from a camera operable with the first client device, the video stream including multiple images at a resolution of 1080p or 720p;
downscale the multiple images from the resolution of 1080p or 720p to a lower resolution of 180p, 270p, 360p or 480p; and
transmit the downscaled multiple images at the lower resolution to the second client device.

12. The system of claim 9, wherein the first device is further configured to:
train the machine learning model with multiple image pairs, wherein the image pairs include an image at the first resolution and a corresponding image at the second resolution, and wherein the machine learning model is trained to receive an input of an image at the first resolution and output an image at the second resolution.

13. The system of claim 9, wherein the machine learning model comprises a convolutional neural network (CNN) that includes:
a multiple channel input to receive an input image into a series of feature extraction blocks; and
multiple upsample blocks, wherein a final upsample block outputs an image of a resolution higher than the input image.

14. A non-transitory computer-readable medium comprising instructions that when executed by a processor, cause the processor to perform one or more operations comprising:
transmitting, by a first client device, a resolution parameter to a second client device, the resolution parameter indicating a first resolution;
receiving, by the first client device, one or more downscaled images at the first resolution from the second client device;
preprocessing each of the one or more downscaled images by dividing the downscaled image into a plurality of sub-images through uniform sampling to generate a first input sub-image and a second input sub-image of a respective input image;
inputting the first input sub-image and the second input sub-image as a multi-channel input into a machine learning model;
generating, by the first client device, a first set of upscaled images by upscaling each of the first input sub-image and the second input sub-image using the machine learning model;
outputting, by the first client device and using the machine learning model, one or more images at a second resolution that is higher than the first resolution; and
displaying, via a user interface of the first client device, the first set of upscaled images.

15. The non-transitory computer-readable medium of claim 14, wherein the first resolution is any one of a resolution of 180p, 270p, 360p, 480p and 720p, and the second resolution is 1080p.

16. The non-transitory computer-readable medium of claim 14, wherein the operations further comprise:
receiving additional one or more images from the second client device, the additional one or more images being at the first resolution or a different resolution than the first resolution;
generating a second set of upscaled images by:
inputting the additional received one or more images into the machine learning model;
upscaling the additional received one or more images by the machine learning model; and
outputting by the machine learning model, additional one or more images at the second resolution; and
displaying, via the user interface of the first client device, the second set of upscaled images.

17. The non-transitory computer-readable medium of claim 14, wherein the operations further comprise:
receiving a video stream from a camera operable with the first client device, the video stream including multiple images at a resolution of 1080p or 720p;
downscaling the multiple images from the resolution of 1080p or 720p to a lower resolution of 180p, 270p, 360p or 480p; and
transmitting, from the first client device, the downscaled multiple images at the lower resolution to the second client device.

18. The non-transitory computer-readable medium of claim 14, wherein the operations further comprise:
training the machine learning model with multiple image pairs, wherein the image pairs include an image at the first resolution and a corresponding image at the second resolution, and wherein the machine learning model is trained to receive an input of an image at the first resolution and output an image at the second resolution.

19. The non-transitory computer-readable medium of claim 14, wherein the machine learning model comprises a convolutional neural network (CNN) including:

a multiple channel input to receive an input image into a series of feature extraction blocks; and multiple upsample blocks, wherein a final upsample block outputs an image of a resolution higher than the input image.

20. The non-transitory computer-readable medium of claim 19, wherein each of the feature extraction blocks include a first convolution block to increase a number of channels of the CNN and a second convolutional block to decrease the number of channels of the CNN.

* * * * *